United States Patent
Okada et al.

(10) Patent No.: US 10,293,431 B2
(45) Date of Patent: May 21, 2019

(54) FRICTION STIR SPOT WELDING APPARATUS AND FRICTION STIR SPOT WELDING METHOD

(71) Applicant: KAWASAKI JUKOGYO KABUSHIKI KAISHA, Kobe-shi, Hyogo (JP)

(72) Inventors: Hideki Okada, Kakamigahara (JP); Junichi Tamura, Kakamigahara (JP); Kenichi Kamimuki, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/533,252

(22) PCT Filed: Dec. 14, 2015

(86) PCT No.: PCT/JP2015/006227
§ 371 (c)(1),
(2) Date: Jun. 5, 2017

(87) PCT Pub. No.: WO2016/098341
PCT Pub. Date: Jun. 23, 2016

(65) Prior Publication Data
US 2017/0341176 A1    Nov. 30, 2017

(30) Foreign Application Priority Data
Dec. 15, 2014  (JP) ................. 2014-253049

(51) Int. Cl.
*B23K 20/00* (2006.01)
*B23K 20/12* (2006.01)
*B23K 20/24* (2006.01)

(52) U.S. Cl.
CPC .......... *B23K 20/125* (2013.01); *B23K 20/122* (2013.01); *B23K 20/123* (2013.01);
(Continued)

(58) Field of Classification Search
CPC ............ B23K 20/1265; B23K 20/1255; B23K 20/126; B23K 20/122; B23K 20/1245; B23K 20/125; B23K 20/129
(Continued)

(56) References Cited

U.S. PATENT DOCUMENTS 5,697,544 A * 12/1997 Wykes ................. B23K 20/125
156/580
2007/0187469 A1    8/2007 Chen et al.
(Continued)

FOREIGN PATENT DOCUMENTS

EP    2 687 315 A1    1/2014
JP    2012-196682 A    10/2012
WO    01/28732 A1    4/2001

Primary Examiner — Erin B Saad
(74) Attorney, Agent, or Firm — Oliff PLC

(57) ABSTRACT

A friction stir spot welding apparatus includes a pin member, a shoulder member, a rotation driver, a forward/backward movement driver, and a controller. The controller controls the forward/backward movement driver, such that the pin member and/or the shoulder member press workpieces before a clamp member presses the workpieces, and then controls the rotation driver and the forward/backward movement driver, such that the pin member and the shoulder member stir the workpieces.

4 Claims, 7 Drawing Sheets

(52) U.S. Cl.
CPC .......... *B23K 20/126* (2013.01); *B23K 20/128* (2013.01); *B23K 20/1265* (2013.01); *B23K 20/24* (2013.01)

(58) Field of Classification Search
USPC .............................. 228/112.1, 113, 114, 2.1
See application file for complete search history.

(56) References Cited

U.S. PATENT DOCUMENTS

| | | | |
|---|---|---|---|
| 2008/0029581 A1 | 2/2008 | Kumagai et al. | |
| 2010/0089976 A1* | 4/2010 | Szymanski | B23K 20/122 228/113 |
| 2011/0068150 A1* | 3/2011 | Baumann | B23K 20/122 228/114 |

* cited by examiner

FRICTION STIR SPOT WELDING APPARATUS AND FRICTION STIR SPOT WELDING METHOD

TECHNICAL FIELD

The present invention relates to a friction stir spot welding apparatus and a friction stir spot welding method.

BACKGROUND ART

In transport vehicles such as automobiles, railcars, and aircrafts, resistance spot welding or riveting has been used for connecting metal members together. However, in recent years, a method of joining metal members together by utilizing frictional heat (friction stir spot welding method) has been drawing attention (see Patent Literature 1, for example).

In the friction stir spot welding method disclosed in Patent Literature 1, an apparatus includes: a substantially columnar pin member; a substantially cylindrical shoulder member including a hollow portion in which the pin member is to be inserted; and a clamp member. The pin member and the shoulder member stir part of workpieces, thereby joining the workpieces together.

CITATION LIST

Patent Literature

PTL 1: Japanese Laid-Open Patent Application Publication No. 2012-196682

SUMMARY OF INVENTION

Technical Problem

In the riveting of aircraft components or the like used in a severe environment, it is required to apply a sealant (a sealing material) between workpieces in order to obtain corrosion resistance. In this respect, the inventors of the present invention conducted diligent studies on methods in which a sealant is applied between workpieces and then the workpieces are joined together by a friction stir spot welding apparatus. As a result of the studies, they have found that favorable joint quality can be realized with high precision by a method described below, thereby arriving at the present invention.

An object of the present invention is to provide a friction stir spot welding apparatus and a friction stir spot welding method that make it possible to realize favorable joint quality in the case of joining sealant-applied workpieces together in double-acting friction stir spot welding.

Solution to Problem

In order to solve the above-described problems, a friction stir spot welding apparatus according to the present invention includes a rotary tool configured to move forward and backward along a rotational axis, and the friction stir spot welding apparatus is configured to: press a distal end of the rotary tool on workpieces, the workpieces being a first member and a second member, which are laid one on top of the other and between which a sealant is applied to a contacting portion of the first member and a contacting portion of the second member, the contacting portions contacting each other; and rotate a contacting part of the rotary tool, the contacting part contacting the workpieces, such that the workpieces are softened by frictional heat and stirred to be joined together. The friction stir spot welding apparatus includes: a columnar pin member configured to be rotatable about an axis and movable forward and backward in a direction along the axis; a cylindrical shoulder member, in which the pin member is inserted, the shoulder member being configured to be rotatable about the axis and movable forward and backward in the direction along the axis; a rotation driver configured to rotate the pin member and the shoulder member about the axis; a cylindrical clamp member, in which the pin member and the shoulder member are inserted, the clamp member being configured to be movable forward and backward in the direction along the axis; a forward/backward movement driver configured to move each of the pin member, the shoulder member, and the clamp member forward and backward along the axis; and a controller configured to control the forward/backward movement driver and the rotation driver. The controller: performs a preliminary operation of controlling the forward/backward movement driver, such that at least one of the pin member and the shoulder member presses the workpieces before the clamp member presses the workpieces; and then performs a stirring operation of controlling the rotation driver and the forward/backward movement driver, such that the pin member and the shoulder member stir the workpieces.

Accordingly, even in the case of joining the sealant-applied workpieces together, since the sealant is squeezed out from the joined portions, the sealant is suppressed from flowing into (getting mixed into) a plastic flow portion of the workpieces. This makes it possible to realize favorable joint quality.

A friction stir spot welding method according to the present invention includes use of a rotary tool configured to move forward and backward along a rotational axis, the method including: pressing a distal end of the rotary tool on workpieces, the workpieces being a first member and a second member, which are laid one on top of the other and between which a sealant is applied to a contacting portion of the first member and a contacting portion of the second member, the contacting portions contacting each other; and rotating a contacting part of the rotary tool, the contacting part contacting the workpieces, such that the workpieces are softened by frictional heat and stirred to be joined together. The friction stir spot welding method includes the steps of: (A) applying the sealant to at least one of the first member and the, second member and bringing the first member and the second member into contact with each other, such that the sealant is sandwiched between the first member and the second member; (B) pressing the workpieces by at least one of a columnar pin member and a cylindrical shoulder member, the pin member being inserted in the shoulder member; (C) pressing the workpieces by a cylindrical clamp member, in which the pin member and the shoulder member are inserted; and (D) stirring the workpieces by the pin member and the shoulder member.

According, even in the case of joining the sealant-applied workpieces together, since the sealant is squeezed out from the joined portions, the sealant is suppressed from flowing into (getting mixed into) a plastic flow portion of the workpieces. This makes it possible to realize favorable joint quality.

The above object, other objects, features, and advantages of the present invention will be made clear by the following detailed description of preferred embodiments with reference to the accompanying drawings.

Advantageous Effects of Invention

The friction stir spot welding apparatus and the friction stir spot welding method according to the present invention make it possible to realize favorable joint quality even in the case of joining sealant-applied workpieces together.

DESCRIPTION OF EMBODIMENTS

Figure 1:
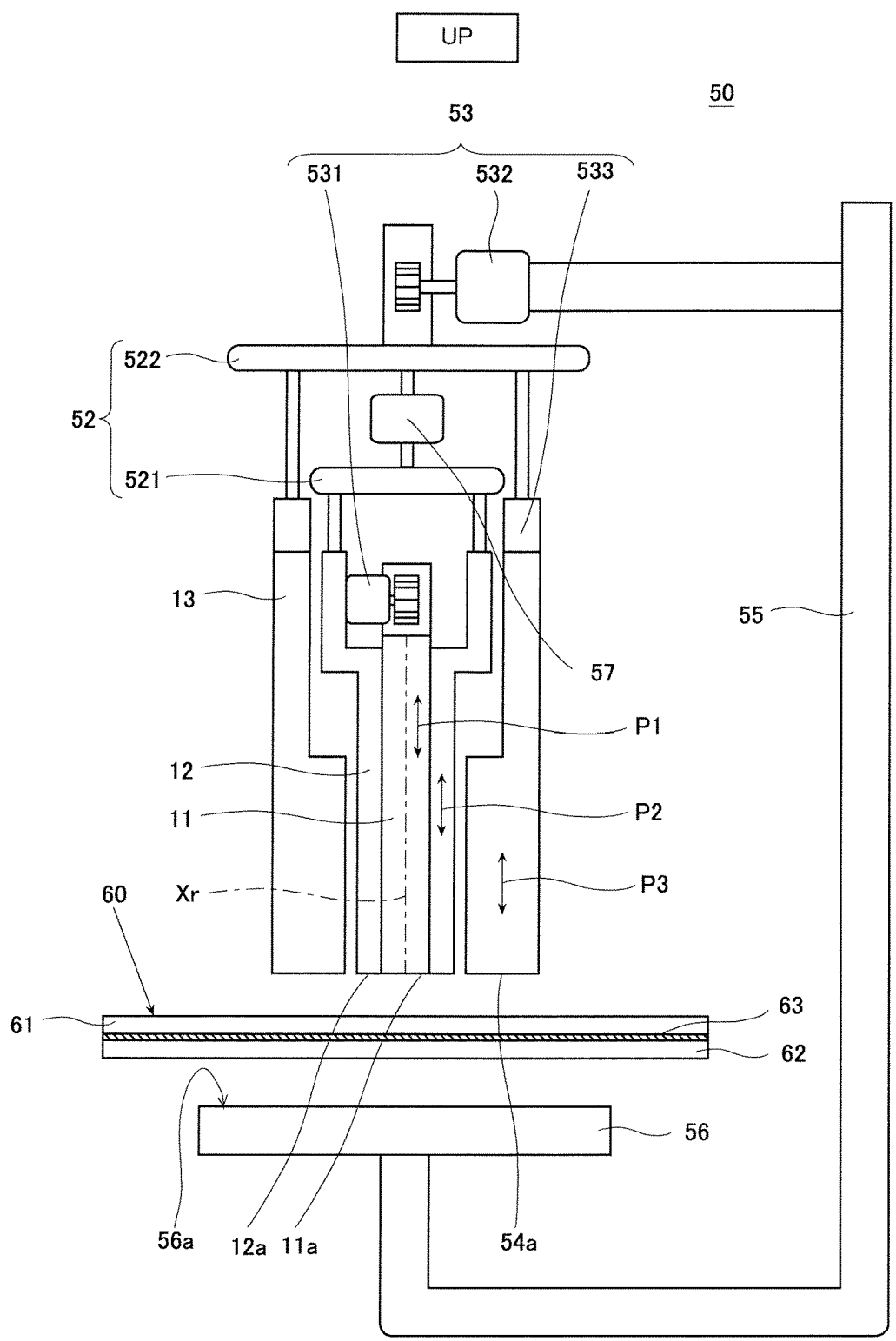
FIG. 1 is a schematic diagram showing a schematic configuration of a friction stir spot welding apparatus according, to Embodiment 1.

Hereinafter, preferred embodiments of the present invention are described with reference to the drawings. In the drawings, the same or corresponding, components are denoted by the same reference signs, and repeating the same descriptions is avoided below. In the drawings, only the components necessary for describing the present invention may be shown, and the other components may be omitted. The present invention is not limited to the embodiments described below.

(Embodiment 1)

A friction stir spot welding apparatus according to Embodiment 1 is a double-acting friction stir spot welding apparatus configured to join workpieces together by stirring part of the workpieces, the workpieces being a first member and a second member, between which a sealant is applied to a contacting portion of the first member and a contacting portion of the second member, the contacting portions contacting each other. The friction stir spot welding apparatus includes: a columnar pin member; a cylindrical shoulder member, in which the pin member is inserted; a rotation driver configured to rotate the pin men tier and the shoulder member about an axis that coincides with a central axis of the pin member; a cylindrical clamp member, in which the pin member and the shoulder member are inserted; a forward/backward movement driver configured to move each of the pin member, the shoulder member, and the clamp member forward and backward along the axis; and a controller configured to control the rotation driver and the forward/backward movement driver. The controller: performs a preliminary operation of controlling the for movement driver, such that at, least one of the pin member and the shoulder member presses the workpieces before the clamp member presses the workpieces; and then performs a joining operation of controlling the rotation driver and the forward/backward movement driver, such that the pin member and the shoulder member stir the workpieces.

The term "press" herein means to apply a pressure to the workpieces, the pressure being sufficient for squeezing the sealant from the contacted part of the workpieces. For example, the term means to apply a pressure of 1000 N to 7000 N (hereinafter, "pressing force") to the workpieces.

Accordingly, the controller may control the forward/backward movement driver to bring the pin member, the shoulder member, and the clamp member into contact with the workpieces (concurrently), and then cause the pin member, the shoulder member, and the clamp member to press the workpieces in this order. Alternatively, the controller may control the forward/backward movement driver to bring the clamp member into contact with the workpieces, and then cause the pin member, the shoulder member, and the clamp member to press the workpieces in this order. It should be noted that the wording "bring . . . into contact" means to apply a pressure smaller than the pressing force to the workpieces. For example, the wording means to apply a pressure smaller than 1000 N to the workpieces.

In the friction stir spot welding apparatus according to Embodiment 1, the controller may control the forward/backward movement driver in the preliminary operation, such that the pin member, the shoulder member, and the clamp member press the workpieces in this order.

Hereinafter, one example of a friction stir spot welding apparatus according to Embodiment 1 is described in detail with reference to the drawings.

[Configuration of Friction Stir Spot Welding Apparatus]

FIG. 1 is a schematic diagram showing a schematic configuration of the friction stir spot welding apparatus according to Embodiment 1. It should be noted that the up-down direction in FIG. 1 indicates the up-down direction in relation to the friction stir spot welding apparatus.

As shown in FIG. 1, a friction stir spot welding apparatus 50 according to Embodiment 1 includes a pin member 11, a shoulder member 12, a tool fixing device 52, a forward/backward movement driver 53, a clamp member 13, a backing support 55, a backing member 56, and a rotation driver 57.

The pin member 11, the shoulder member 12, the tool fixing device 52, the forward/backward movement driver 53, the clamp member 13, and the rotation driver 57 are provided on the upper part of the backing support 55, which is formed as a C-type gun (C-shaped frame). The backing member 56 is provided on the lower part of the backing support 55. The pin member 11, the shoulder member 12, and the clamp member 13 are mounted to the backing support 55 at a position that is opposite to a position where the backing member 56 is mounted to the backing support 55, such that the pin member 11, the shoulder member 12, and the clamp member 13 face the backing member 56. It should be noted that workpieces 60 are placed between the backing member 56 and the pin, shoulder, and clamp members 11 to 13.

The pin member 11, the shoulder member 12, and the clamp member 13 are fixed to the tool fixing device 52, which includes a rotary tool fixing device 521 and a clamp fixing device 522. Specifically, the pin member 11 and the shoulder member 12 are fixed to the rotary tool fixing device 521, and the clamp member 13 is fixed to the clamp fixing device 522. The rotary tool fixing device 521 is supported by the clamp fixing device 522 via the rotation driver 57.

The pin member 11, the shoulder member 12, and the clamp member 13 are driven to move forward and backward in the up-down direction by the forward/backward movement driver 53, which includes a pin driver 531, a shoulder driver 532, and a clamp driver 533.

The pin member 11 has a columnar shape. The pin member 11 is supported by the rotary tool fixing device 521 although it is not shown in detail in FIG. 1. The pin member 11 is configured to be driven by the rotation driver 57 to rotate about an axis Xr (a rotational axis) corresponding to the central axis of the pin member 11, and driven by the pin driver 531 to move forward and backward in an arrow P1 direction, i.e., an axis Xr direction (in FIG. 1, up-down direction.). The pin driver 531 may be configured in any form, so long as the pin driver 531 is configured to impart welding pressure to the pin member 11. For example, a mechanism using gas pressure, hydraulic pressure, servomotor, or the like can be suitably used as the pin driver 531.

The shoulder member 12 has a cylindrical shape and includes a hollow portion. The shoulder member 12 is supported by the rotary tool fixing device 521. The pin member 11 is inserted in the hollow portion of the shoulder member 12. In other words, the shoulder member 12 is disposed in a manner to surround the outer peripheral surface of the pin member 11.

The shoulder member 12 is configured to be driven by the rotation driver 57 to rotate about the axis Xr shared with the pin member 11, and driven by the shoulder driver 532 to move forward and backward in an arrow P2 direction, i.e., the axis Xi direction. The shoulder driver 532 may be configured in any form, so long as the shoulder driver 532 is configured to impart welding pressure to the shoulder member 12. For example, a mechanism using gas pressure, hydraulic pressure, servomotor, or the like can be suitably used as the shoulder driver 532.

As described above, the pin member 11 and the shoulder member 12 (rotary tool) are supported by the same rotary tool fixing device 521 in the present embodiment. Both the pin member 11 and the shoulder member 12 are driven by the rotation driver 57 to integrally rotate about the axis Xr. Also, the pin member 11 and the shoulder member 12 are configured to be driven by the pin driver 531 and the shoulder driver 532, respectively, to move forward and backward along the axis Xr direction. It should be noted that, in Embodiment 1, the pin member 11 is movable forward and backward independently, and also movable forward and backward in accordance with the forward and backward movement of the shoulder member 12. Alternatively, the, pin member 11 and the shoulder member 12 may be configured to be movable forward and backward independently of each other.

Similar to the shoulder member 12, the clamp member 13 has a cylindrical shape, includes a hollow portion, and is provided such that the central axis thereof coincides with the axis Xr. The shoulder member 12 is inserted in the hollow portion of the clamp member 13.

That is, the cylindrical shoulder member 12 is disposed in a manner to surround the outer peripheral surface of the pin member II, and the cylindrical clamp member 13 is disposed in a manner to surround the outer peripheral surface of the shoulder member 12. In other words, the clamp member 13, the shoulder member 12, and the pin member 11 form a nested structure, in which these components are arranged concentrically.

The clamp member 13 is configured to be driven by the clamp driver 533 to move in an arrow P3 direction (which coincides with the arrow P1 and P2 directions). The clamp driver 533 may be configured in any firm, so long as the clamp driver 533 is configured to impart welding pressure to the clamp member 13. For example, a mechanism using gas pressure, hydraulic pressure, servomotor, or the like can be suitably used as the clamp driver 533.

The pin member 11, the shoulder member 12, and the clamp member 13 include a distal end surface a distal end surface 12a, and a distal end surface 13a, respectively. The pin member 11, the shoulder member 12, and the clamp member 13 are driven by the forward/backward movement driver 53 to move forward and backward, such that each of the distal end surface 11a, the distal end surface 12a, and the distal end surface 13a is brought into contact with the front surface of the workpieces 60 and presses the workpieces 60.

In Embodiment 1, the backing member 56 is configured to contact and support the back surface of the flat plate-shaped workpieces 60 by a fiat surface (a supporting surface 56a). The configuration of the backing member 56 is not particularly limited, so long as the backing member 56 is configured to properly support the workpieces 60 so that friction stir spot welding can be performed thereon. For example, backing members 56 of different shape types may be prepared separately, and the backing member 56 that is currently attached to the backing, support 55 may be detached therefrom and replaced with another backing member 56 in accordance with the type of the workpieces 60.

It should be noted that specific configurations of the pin member 11, the shoulder member 12, the tool fixing device 52, the forward/backward movement driver 53, the clamp member 13, the backing support 55, and the rotation driver 57 in Embodiment 1 are not limited to the alive-described configurations. Configurations widely known in the field of friction stir welding can be suitably adopted. For example, the pin driver 531 and the shoulder driver 532 may be configured by using motors, gear mechanisms, etc., known in the field of friction stir welding.

Although a C-type gun serves as the backing support 55 in Embodiment 1, the configuration of the backing support 55 is not thus limited. The backing support 55 may be configured in any form, so long as the backing support 55 is configured to support the pin member 11, the shoulder member 12, and the clamp member 13 in a manner to allow them to move forward and backward, and support the backing member 56 at such a position that the backing member 56 faces the pin member 11, the shoulder member 12, and the clamp member 13.

The friction stir spot welding apparatus 50 according to Embodiment 1 is to be mounted on a friction stir spot welding robotics device (not shown). Specifically, the backing support 55 is mounted on the distal end of an arm of the robotics device. Therefore, the backing support 55 can he assumed to be included in the friction stir spot welding robotics device. The specific configuration of the friction stir spot welding robotics device including the backing support 55 and the arm is not particularly limited. The configuration of an articulated robot or the like known in the field of friction stir welding can be suitably adopted.

It should be noted that the friction stir spot welding apparatus 50 (including the backing support 55 is suitably applicable not only to friction stir spot welding robotics devices, but also to, for example, known machining devices such as NC machine tools, large C frames, and automatic riveters.

The friction stir spot welding apparatus 50 according to Embodiment 1 may be configured such that two pairs or more of robots are used such that the components of the friction stir spot welding apparatus 50 other than the backing member 56 face the hacking member 56. Moreover, the workpieces 60 may be held by a hand if friction stir spot welding with the friction stir spot welding apparatus 50 can be stably performed on the workpieces 60 held by the hand. Furthermore, a robot may be used as a positioner or the workpieces 60.

[Control Configuration of Friction Stir Spot Welding Apparatus]

Next, a control configuration of the friction stir spot welding apparatus 50 according to Embodiment 1 is specifically described with reference to FIG. 2.

Figure 2:
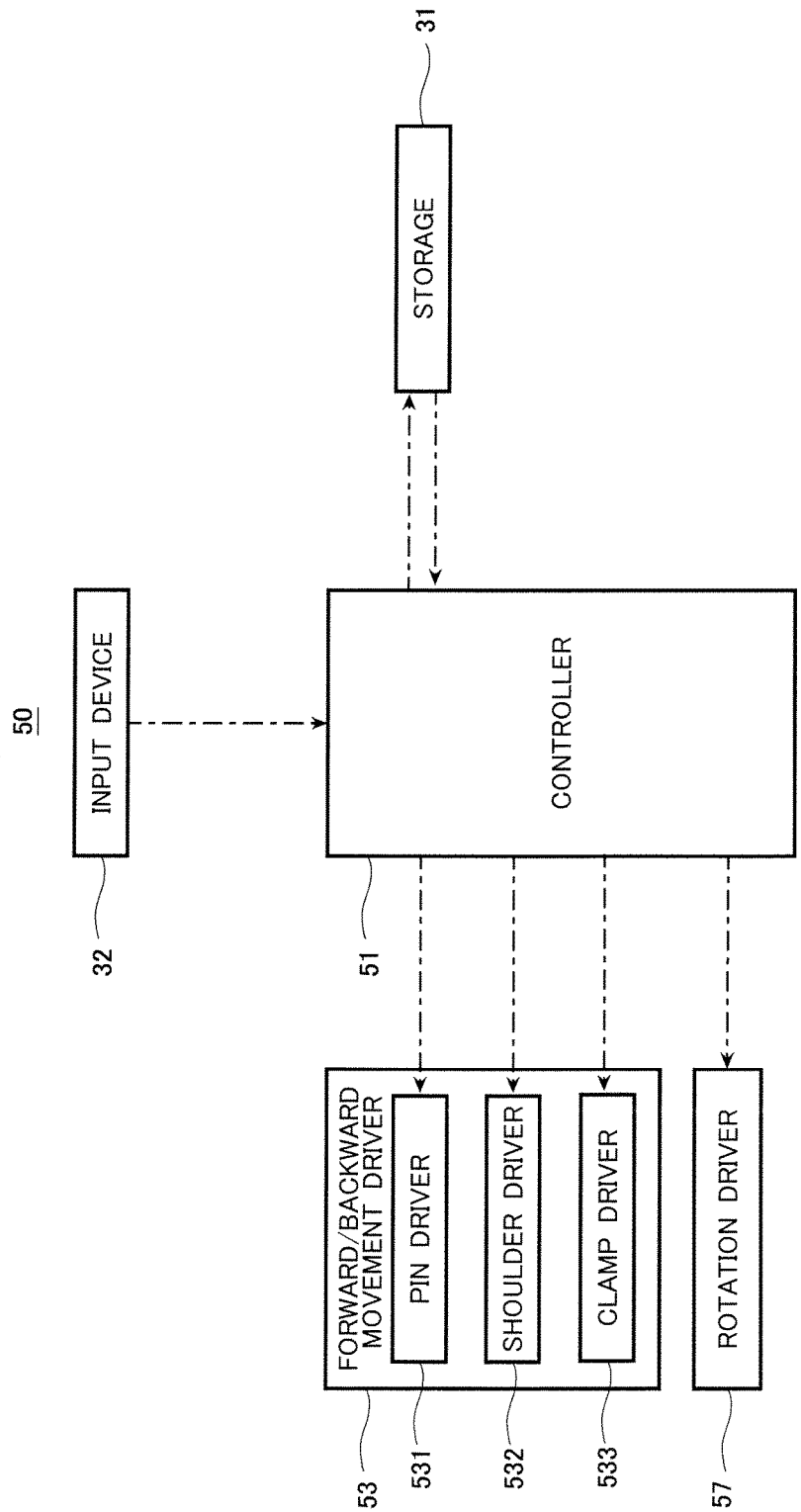
FIG. 2 is a block diagram schematically showing a control configuration of the friction stir spot welding apparatus shown in FIG. 1.

FIG. 2 is a block diagram schematically showing the control configuration of the friction stir snot welding apparatus shown in FIG. 1.

As shown in FIG. 2, the friction stir spot welding apparatus 50 includes a controller 51, a storage 31, and an input device 32.

The storage 31 stores various data in a retrievable manner. The storage 31 is configured as, for example, a storage device such as a known memory or hard disk. The storage 31 is not necessarily configured as a single storage device, but may be configured as a plurality of storage devices (e.g., a random access memory and a hard disk drive). In a case where the controller 51 or the like is configured as a microcomputer, at least part of the storage 31 may be configured as an internal memory of the microcomputer, or as an independent memory.

The data stored in the storage 31 may be retrievable by any section other than the controller 51. Of course, data may be writable in the storage 31 by the controller 51 or the like.

The input device 32 allows the input of, for example, various parameters relating to the control of friction stir spot welding or other data into the controller 51. A known input device, such as a keyboard, a touch panel, a group of push button switches, or the like, serves as the input device 32. In Embodiment 1, at least joining conditions for the workpieces 60, for example, thickness and material data of the workpieces 60, can be inputted by the input device 32.

The controller 51 is configured to control components (devices) forming the friction stir spot welding apparatus 50. Specifically, the controller 51 controls the pin driver 531, the shoulder driver 532, and the clamp driver 533 forming the forward/backward movement driver 53, and also controls the rotation driver 57. Through the control by the controller 51, switching between forward movement and backward movement of the pin member 11, the shoulder member 12, and the clamp member 13 can be controlled, and also, the distal end position, moving speed, moving direction, etc., of each of the pin member 11, the shoulder member 12, and the clamp member 13 when these members move forward and backward can be controlled. Moreover, the pressing force of each of the pin member 11, the shoulder member 12, and the clamp member 13 when pressing the workpieces 60 can be controlled. Furthermore, the rotation speed of each of the pin member 11 and the shoulder member 12 can be controlled.

The specific configuration of the controller 51 is not particularly limited. In Embodiment 1, the controller 51 is configured as a microcomputer and includes a CPU. Through the loading and execution, by the CPU, of a predetermined control program stored in the storage 31, the controller 51 performs arithmetic operation relating to the operations of the forward/backward movement driver 53 and the rotation driver 57. It should be noted that the controller 51 is not necessarily configured as a single controller, but may be configured as a group of multiple controllers that operate in cooperation with each other to control the friction stir spot welding apparatus 50.

At the start of the work of joining the workpieces 60, the controller 51 controls the forward/backward movement driver 53, such that the pin member 11, the shoulder member 12, and the clamp member 13 press the workpieces 60 in this order.

[Friction Stir Spot Welding Method (Operations of Friction Stir Spot Welding Apparatus)]

Next, operations of the friction stir spot welding apparatus 50 according to Embodiment 1 are specifically described with reference to FIG. 3, FIG. 4A, FIG. 4B, and FIG. 4C. It should be noted that FIG. 4A, FIG. 4B, and FIG. 4C show an example in Which.: two metal plates 61 and 62 are used as the workpieces 60; a sealant 63 is applied to the upper surface of the metal plate 62 (i.e., the surface that comes into contact with the metal plate 61); and then, the metal plates 61 and 62 are laid one on top of the other and joined together by spot welding.

Figure 3:
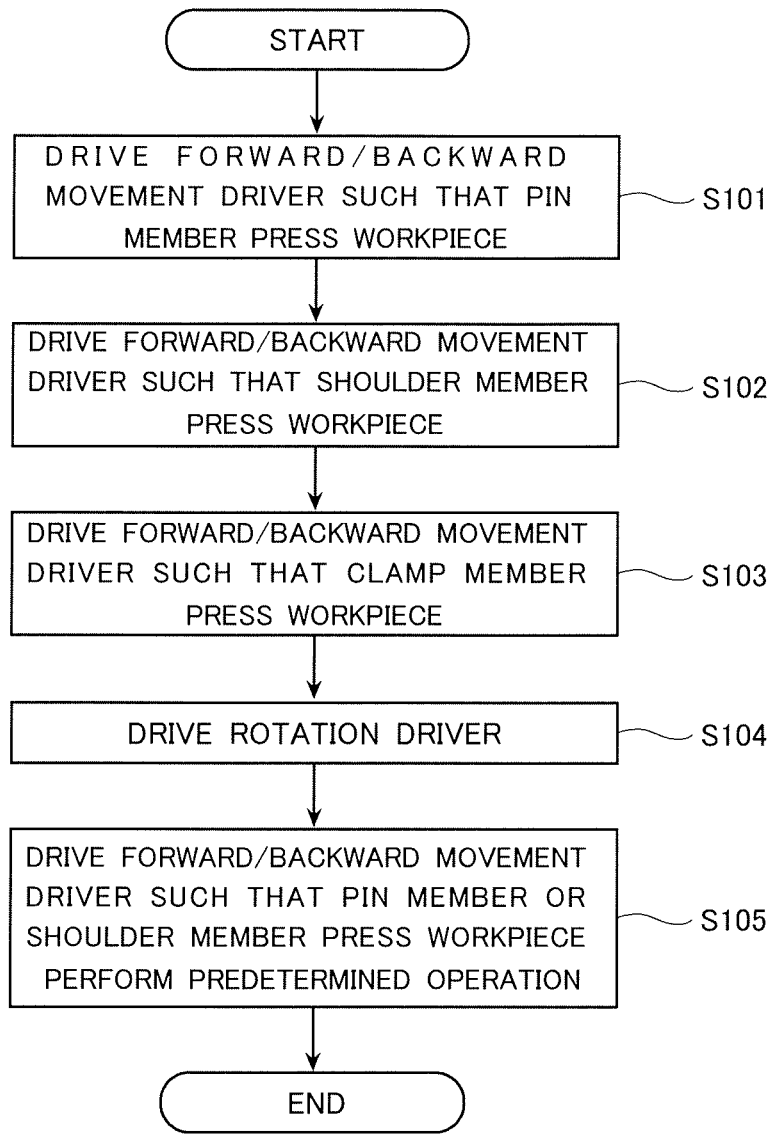
FIG. 3 is a flowchart showing one example of operations of the friction stir spot welding apparatus according to Embodiment 1.

FIG. 3 is a flowchart showing one example of operations of the friction stir spot welding apparatus according to Embodiment 1. FIG. 4A, FIG. 4B, and FIG. 4C are process drawings each schematically showing one example of processes of friction stir spot welding performed by the friction stir spot welding apparatus shown in FIG. 1.

Figure 4A:
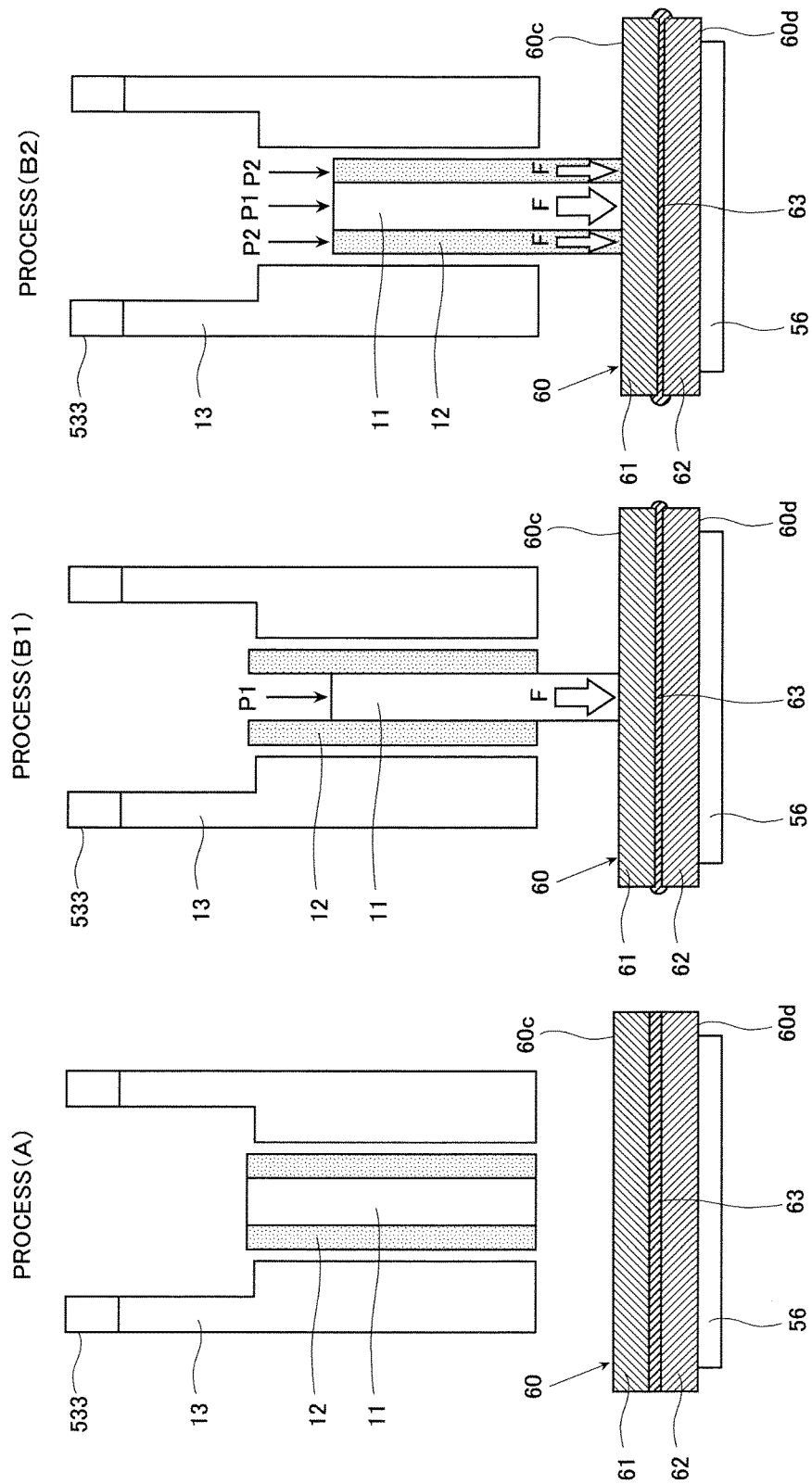
FIG. 4A is a process drawing schematically showing one example of processes of friction stir spot welding performed by the friction stir spot welding apparatus shown in FIG. 1.
Figure 4B:
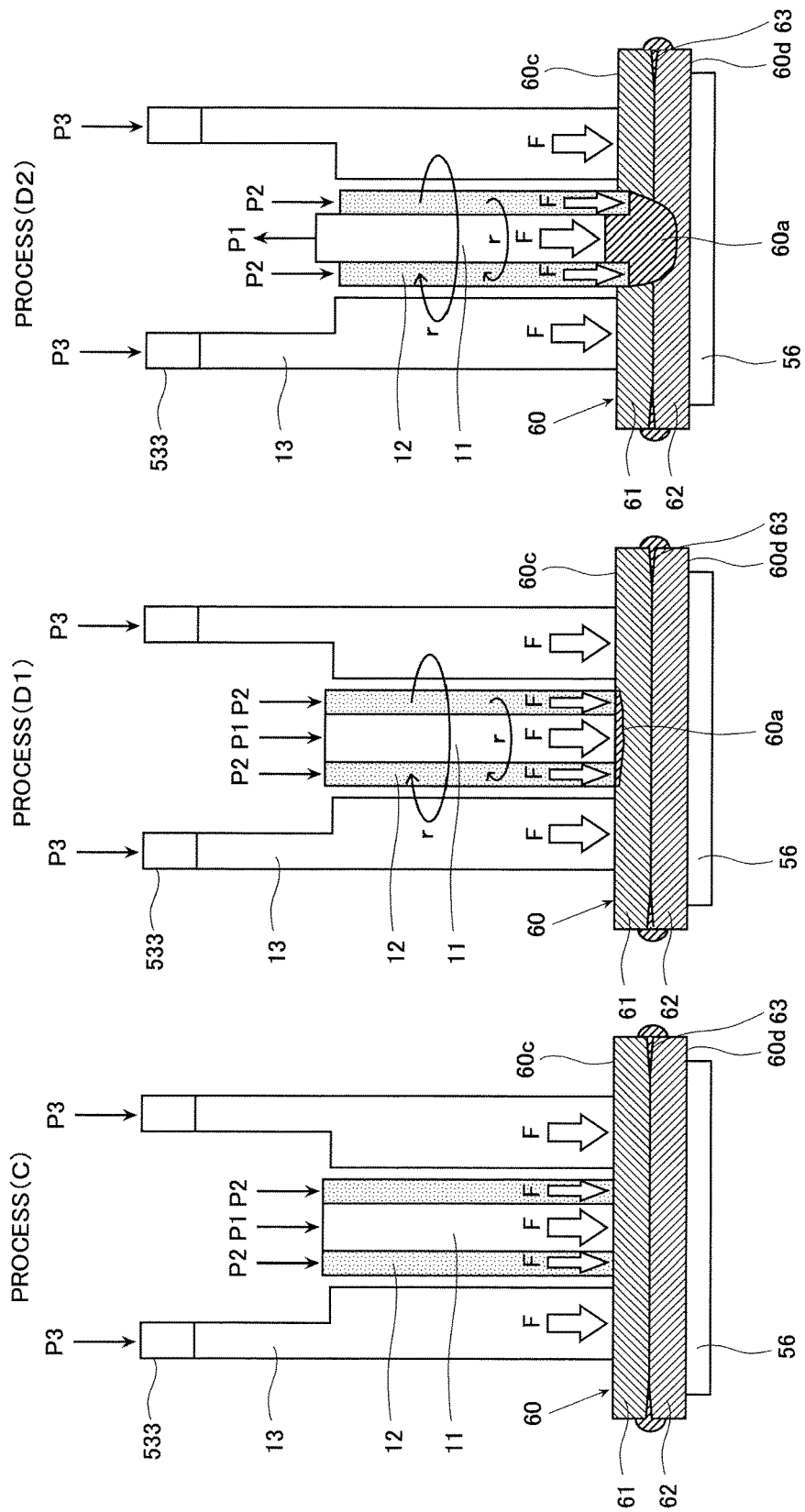
FIG. 4B is a process drawing schematically showing one example of processes of friction stir spot welding performed by the friction stir pot welding apparatus shown in FIG. 1.
Figure 4C:
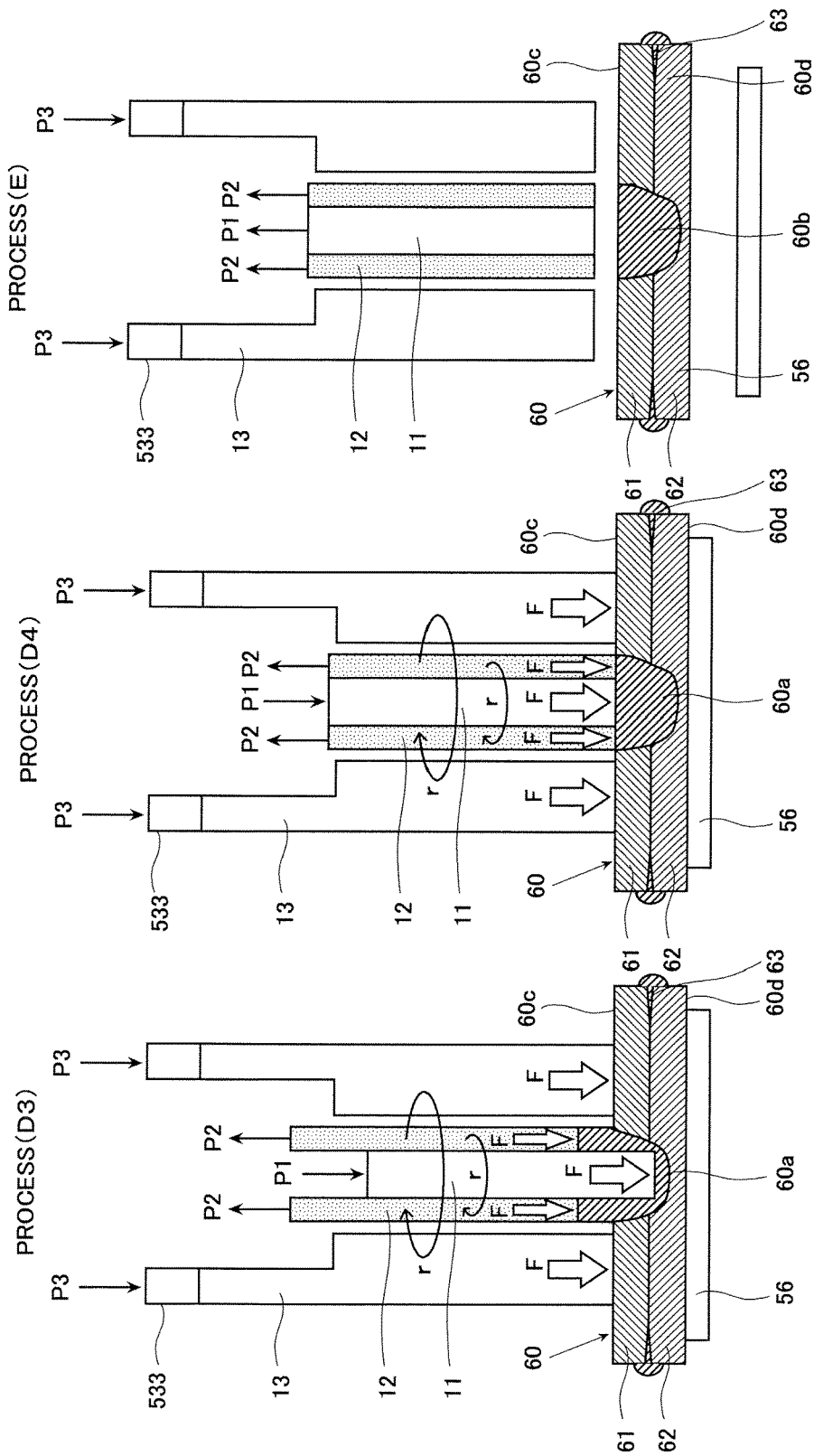
FIG. 4C is a process drawing schematically showing one example of processes of friction stir spot welding performed by the friction stir spot welding apparatus shown in FIG. 1.

It should be noted that, in FIG. 4A. FIG. 4B, and FIG. 4C, part of the friction stir spot welding apparatus is omitted; arrows r indicate the rotation direction of the pin member 11 and the shoulder member 12; and block arrows F indicate the direction of force applied to the metal plates 61 and 62. Although force is applied to the metal plates 61 and 62 from the backing member 56, the application of the force is not shown in FIG. 4A, FIG. 4B, and FIG. 4C for the sake of convenience of the description. In addition, in order to clearly distinguish the shoulder member 12 from the pin member 11 and the clamp member 13, the shoulder member 12 is indicated by hatching.

First, as shown in FIG. 4A, the metal plate (second member) 62 is placed on the upper surface of the backing member 56, and the sealant 63 is applied to the metal plate 62. As the sealant 63, for example, a synthetic rubber (such as polysulfide-based synthetic rubber, natural rubber, silicone rubber, or fluororubber) or a resin (such as tetrafluoroethylene rubber resin) can be used. Then, the metal plate (first member) 61 is placed over the upper surface of the metal plate 62 in a manner to sandwich the sealant 63 (process (A)).

Next, the controller 51 performs a preliminary operation. Specifically, as shown in FIG. 3 and FIG. 4A, the controller 51 drives the forward/backward movement driver 53, such that the pin member 11 presses a front surface 60c of the workpieces 60 (the upper surface of the metal plate 61) with first pressing force PI set in advance (Step S101; process (B1)). The first pressing force herein may be set arbitrarily through an experiment or the like in advance. For example, the first pressing force may be 2000 to 15000 N. The first pressing three is suitably determined based on the diameter of the pin member 11 and the thickness of the workpieces 60.

As a result, the pin member 11 and the backing member 56 sandwich the metal plate 61, the sealant 63, and the metal plate 62. Since the pin member 11 presses the front surface 60c of the workpieces 60, when seen in the vertical direction, part of the sealant 63, the part being positioned coinciding with and in the vicinity of the distal end surface 11a of the pin member 11, is squeezed outward from its original position. As a result, the sealant 63 protrudes from peripheral edge surfaces of the workpieces 60.

Next, the controller 51 drives the forward/backward movement driver 53, such that the shoulder member 12 presses the front surface 60c of the workpieces 60 with second pressing force set in advance (step S102, process (B2)). The second pressing, force herein may be set arbitrarily through an experiment or the like in advance. For example, the second pressing force may be 2000 to 15000 N. The second pressing force is suitably determined based on the internal and external diameters of the shoulder member 12 and the thickness of the workpieces 60.

As a result, the pin and shoulder members 11 and 12 and the backing member 56 sandwich the metal plate 61, the sealant 63, and the metal plate 62. Since not only the pin member 11 but also the shoulder member 12 presses the front surface 60c of the workpieces 60, when seen in the vertical direction, part of the sealant 63, the part being positioned coinciding with and in the vicinity of the distal end sur ace 12a of the shoulder member 12, is squeezed outward from the position. As a result, the sealant 63 further protrudes from the peripheral edge surfaces of the workpieces 60.

Next, the controller 51 drives the forward/backward movement driver 53, such that the clamp member 13 presses the front surface 60c of the workpieces 60 with first pressing three set in advance (step S103; process (C)). The third pressing force herein may be set arbitrarily through an experiment or the like in advance. For example, the third pressing force may be 2000 to 15000 N. The third pressing force is suitably determined based on the internal and external diameters of the clamp member 13 and the thickness of the workpieces 60.

As a result, the pin, shoulder, and clamp members 11 to 13 and the backing member 56 sandwich the metal plate 61, the sealant 63, and the metal plate 62. Since not only the pin member 11 and the shoulder member 12 but also the clamp member 13 presses the front surface 60c of the workpieces 60, when seen in the vertical direction, part of the sealant 63, the part being positioned coinciding with and in the vicinity of the distal end surface 13a of the clamp member 13, is squeezed outward from the position. As a result, the sealant 63 further protrudes from the peripheral edge surfaces of the workpieces 60. It should be noted that since part of the sealant 63 is present on the peripheral edge portions of the workpieces 60, the joint faying surfaces of the workpieces 60 can be sealed by the part of the sealant 63.

Next, the controller 51 performs a joining operation (process (D)). Specifically, the controller 51 drives the rotation driver 57 at a predetermined rotation speed set in advance, thereby rotating the pin member 11 and the shoulder member 12 in a state where the pin member 11 and the shoulder member 12 are in contact with the front surface 600 of the workpieces 60 (step S104; process (D1)). In this state, both the pin member 11 and the shoulder member 12 neither move forward nor backward. Accordingly, the front surface 60c of the workpieces 60 is "preheated" by the pin member 11 and the shoulder member 12. As a result, the metal material in the contacted region of the metal plate 61 generates heat due to friction and thereby softens. Consequently, a plastic flow portion 60a is formed in the vicinity of the front surface 60c of the workpieces 60.

Next, the controller 51 controls the forward/backward movement driver 53, such that the pin member 11 or the shoulder member 12 performs a predetermined operation (step S105). Specifically, the controller 51 controls the forward/backward movement driver 53 in accordance with a predetermined control program stored in the storage 31.

At the time, when the cross-sectional area of the distal end surface of the pin member 11 is Ap; the cross-sectional area of the distal end surface of the shoulder member 12 is As; the press-in depth of the pin member 11 is Pp; and the press-in depth of the shoulder member 12 is Ps, the controller 51 preferably controls the forward/backward movement driver 53 to make the absolute value of an average tool position. Tx defined by an equation (I) shown below small.

$$Ap \cdot Pp + As \cdot Ps = Tx \tag{I}$$

More preferably, the controller 51 controls the forward/backward movement driver 53 such that the average tool position Tx=0. It should be noted that specific control for making the absolute value of the average tool position Tx small is disclosed by Patent Literature 1 in detail. Therefore, the description of the control is omitted herein.

Next, the controller 51 controls the pin driver 531 and/or the shoulder driver 532 (see FIG. 1) to move the pin member 11 backward from the front surface 60c of the workpieces 60, thereby causing the shoulder member 12 to further move into the front surface 60c of the workpieces 60 (i.e., press the shoulder member 12 into the front surface 60c) (see process (D2) in FIG. 4B). At the time, the softening metal material portion extends from the upper metal plate 61 to the lower metal plate 62, and thus the volume of the plastic flow portion 60a increases. Further, the softening metal material in the plastic flow portion 60a is pushed away by the shoulder member 12, such that the softening metal material flows from immediately below the shoulder member 12 to immediately below the pin member 11. As a result, the pin member 11 is moved backward and lifted relative to the shoulder member 12.

Next, the controller 51 controls the pin driver 531 to move (press) the pin member 11, which has previously been moved backward, into the metal plate 61 gradually. This causes the shoulder member 12 to move backward from the metal plate 61(see process (D3) in FIG. 4C). It should be noted that process (D3) need not be performed if the front surface 60c of the metal plate 61 is sufficiently shaped by process (D4), which will be described below.

If the process is to proceed from (D2) to (D4) directly, then in process (72), the controller 51 controls the pin driver 531 to move the pin member 11 forward gradually. On the other hand, if the process is to proceed from (D2) to (D4) through (D3), then in process (D3), the controller 51 controls the pin driver 531 to draw the pin member 11 backward gradually. Here, even while the pin member 11 or the shoulder member 12 is being drawn backward, the welding pressure at its distal end is kept (see arrows F in process (D2) shown in FIG. 4B and in process (D3) shown in FIG. 4C).

Accordingly, while the shoulder member 12 is being drawn backward, since the rotation and pressing by the pin member 11 are kept, the softening metal material in the plastic flow portion 60a flows from immediately below the pin member 11 to immediately below the shoulder member 12, and thereby the recess previously formed as a result of the pressing-in by the shoulder member 12 is backfilled.

On the other hand, while the pin member 11 is being drawn backward, since the rotation and pressing by the shoulder member 12 are kept, the softening metal material in the plastic flow portion 60a flows from immediately below the shoulder member 12 to immediately below the pin member 11, and thereby the recess previously formed as a result of the pressing-in by the pin member 11 is backfilled.

Next, the controller 51 controls the forward/backward movement driver 53 to make the distal end surface 11a of the pin member 11 and the distal end surface 12a of the shoulder member 12 substantially level with (flush with) each other (see process (D4) in FIG. 4C). In this manner, the front surface 60c of the workpieces 60 is shaped, and consequently, a substantially flat surface with no substantial recess is obtained.

Then, the controller 51 controls the forward/backward movement driver 53 to remove the pin member 11, the shoulder member 12, and the clamp member 13 from the workpieces 60. Thereafter, the controller 51 controls the rotation driver 57 to stop the pin member 11 and the shoulder member 12 from rotating, thereby ending the series of friction stir spot welding (i.e., ending the joining of the workpieces 60) (see process (E) in FIG. 4C). As a result, the rotation (as well as the pressing), which is applied to the metal plates 61 and 62 when the pin member 11 and the shoulder member 12 are brought into contact with the workpieces 60, is no longer applied to the metal plates 61 and 62. Consequently, the plastic flow in the plastic flow portion 60a extending across both the metal plate 61 and the metal plate 62 stops, and the plastic flow portion 60a turns into a joint 60b.

In this manner, the two metal plates 61 and 62 are connected (joined) together by the joint 60b. It should be noted that when a predetermined period elapses, the sealant 63 becomes hardened, and thereby the joint faying surfaces of the metal plates 61 and 62 are sealed up.

As described above, in the friction stir spot welding apparatus 50 according to Embodiment 1, the pin member 11, the shoulder member 12, and the clamp member 13 press the front surface 60c of the workpieces 60 in this order. As a result, when seen in the vertical direction, part of the sealant 63, the part being positioned coinciding with and in the vicinity of the distal end surfaces of the pin member 11, the shoulder member 12, and the clamp member 13, is squeezed outward. Accordingly, when the pin member 11 and the shoulder member 12 are rotated and the plastic flow portion 60a is formed, the sealant 63 can be suppressed from flowing into (getting mixed into) the plastic flow portion 60a, and thereby favorable joint quality can be realized.

Since the friction stir spot welding apparatus 50 according to Embodiment 1 is capable of suppressing the sealant 63 from flowing into (getting mixed into) the plastic flow portion 60a, the sealant 63 is suppressed from adhering to the pin member 11 and/or the shoulder member 12. Therefore, in the case of continuously joining workpieces 60, the distal end surface of the pin member 11 and/or the distal end surface of the shoulder member 12 can be stably pressed on each front surface 60c of the workpieces 60. Moreover, the sealant 63 can be suppressed from adhering to the front surface 60c of the workpieces 60, and thereby favorable joint quality can be realized.

(Embodiment 2)

A friction stir spot welding apparatus according to Embodiment 2 is configured such that, in the friction stir spot welding apparatus according to Embodiment 1, the controller controls the forward/backward movement driver, such that the pin member and the shoulder member (concurrently) press the workpieces, and thereafter the clamp member presses the workpieces.

Hereinafter, one example of the friction stir spot welding apparatus according to Embodiment 2 is described in detail with reference to the drawings. It should be noted that since the fundamental configuration of the friction stir spot welding apparatus according to Embodiment 2 is the same as that of the friction stir spot welding apparatus according to Embodiment 1, the description of the configuration of the friction stir spot welding apparatus according to Embodiment 2 is omitted herein.

[Friction Stir Spot Welding Method (Operations of Friction Stir Spot Welding Apparatus)]

Figure 5:
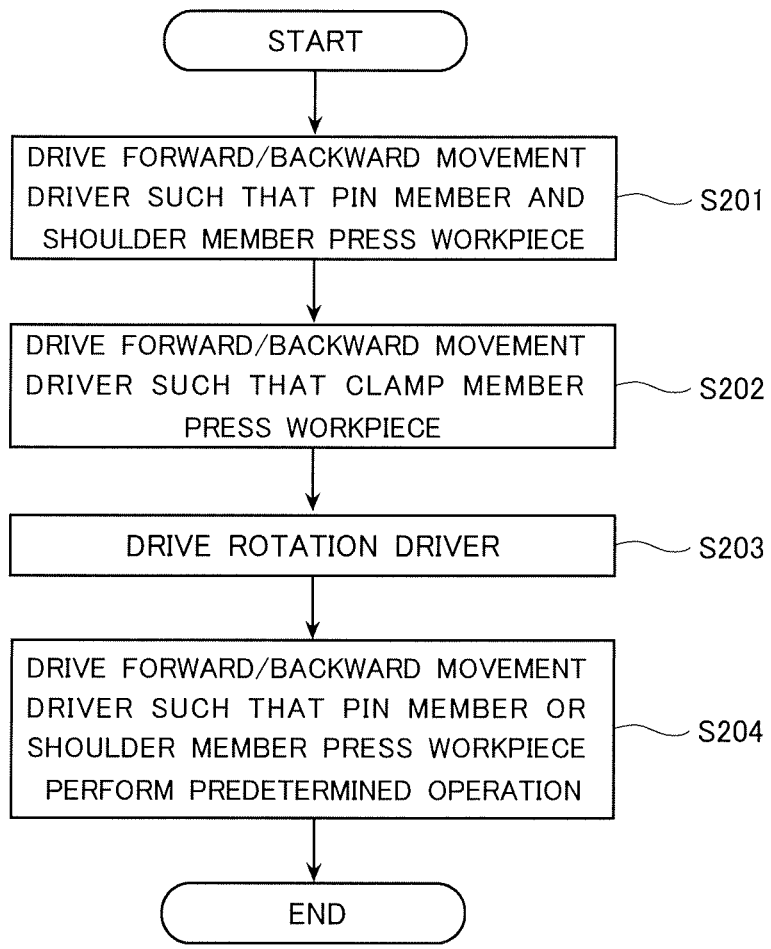
FIG. 5 is a flowchart showing one example of operations of a friction stir spot welding apparatus according to Embodiment 2.

FIG. 5 is a flowchart showing one example of operations of the friction stir spot welding apparatus according to Embodiment 2.

First, similar to Embodiment 1, the metal plate 62 is placed on the upper surface of the backing member 56, and the sealant 63 is applied to the metal plate 62. Then, the metal plate 61 is placed over the upper surface of the metal plate 62 in a manner to sandwich the sealant 63 (see process (A) in FIG. 4A).

Next, as shown in FIG. 5, the controller 51 drives the forward/backward movement driver 53, such that the pin member 11 and the shoulder member 12 press the front surface 60c of the workpieces 60 the upper surface of the metal plate 61) with fourth pressing force P4 set in advance (step S201). The fourth pressing force herein may be set arbitrarily through an experiment or the like in advance. For example, the fourth pressing force may be 2000 to 15000 N.

As a result, the pin and shoulder members 11 and 12 and the backing member 56 sandwich the metal plate 61, the sealant 63, and the metal plate 62. Since the pin member 11 and the shoulder member 12 press the front surface 60c of the workpieces 60, when seen in the vertical direction, part of the sealant 63, the part being positioned coinciding with and in the vicinity of the distal end surface 11a of the pin member 11 and the distal end surface 12a of the shoulder member 12, is squeezed outward from the position. As a result, the sealant 63 protrudes from peripheral edge surfaces of the workpieces 60.

Next, the controller 51 drives the forward/backward movement driver 53, such that the clamp member 13 presses the front surface 60c of the workpieces 60 with the first pressing force set in advance (step S202).

As a result, the pin, shoulder, and clamp members 11 to 13 and the backing member 56 sandwich the metal plate 61, the sealant 63, and the metal plate 62. Since, not only the pin member 11 and the shoulder member 12 but also the clamp member 13 presses the front surface 60c of the workpieces 60, when seen in the vertical direction, part of the sealant 63, the part being positioned coinciding with and in the vicinity of the distal end surface 13a of the clamp member 13, is squeezed outward from the position. As a result, the sealant 63 further protrudes from the peripheral edge surfaces of the workpieces 60.

Next, the controller 51 drives the rotation driver 57 at a predetermined rotation speed set in advance, thereby rotating the pin member 11 and the shoulder member 12 in a state where the pin member 11 and the shoulder member 12 are in contact with the front surface 60c of the workpieces 60 (step S203).

Next, the controller 51 controls the forward/backward movement driver 53, such that the pin member 11 or the shoulder member 12 performs a predetermined operation (step S204). It should be noted that since the predetermined operation in step S204 is the same as the predetermined operation performed by the friction stir spot welding apparatus 50 according to Embodiment 1, a detailed description of the predetermined operation is omitted herein.

The friction stir spot welding apparatus 50 according to Embodiment 2 with the above-described configuration provides the same functional advantages as those provided by the friction stir spot welding apparatus 50 according to Embodiment 1.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention. In addition, various inventions can be made by suitable combinations of a plurality of components disclosed in the above embodiments.

INDUSTRIAL APPLICABILITY

The friction stir spot welding apparatus and the friction stir spot welding method according to the present invention are useful since they make it possible to realize favorable joint quality even in the case of joining sealant-applied workpieces together.

REFERENCE SIGNS LIST 11 pin member
11a distal end surface
13 shoulder member
12a distal end surface
13 clamp member
13a distal end surface
31 storage
32 input device
50 friction stir spot welding apparatus
51 controller
52 tool fixing device
53 forward/backward movement driver
55 backing support
56 backing member
56a supporting surface
57 rotation driver
60 workpiece
60a plastic flow portion
60b joint
60c front surface
60d back surface
61 metal plate
62 metal plate
63 sealant
521 rotary tool fixing device
522 clamp fixing device
531 pin driver
532 shoulder driver
533 clamp driver

The invention claimed is:

1. A friction stir spot welding apparatus comprising:
a rotary tool including (i) a columnar pin member, (ii) a cylindrical shoulder member, in which the pin member is inserted, and (iii) a cylindrical clamp member, in which the pin member and the shoulder member are inserted, a distal end of each of the columnar pin member, cylindrical shoulder member, and cylindrical clamp member being configured to be pressed on a workpiece, the workpiece including a first member disposed on top of a second member and sandwiching a sealant between the first member and the second member;
a rotation driver configured to rotate the pin member and the shoulder member about a rotational axis that coincides with a central axis of the pin member, and when the distal end of at least one of the pin member and the shoulder member is in contact with the workpiece, the rotation of the at least one of the pin member and the shoulder member causes the first member and the second member to be softened by frictional heat and stirred to be joined together;
a forward/backward movement driver configured to move each of the pin member, the shoulder member, and the clamp member forward and backward along the rotational axis; and
a controller including a processor and a memory, the controller being programmed to:
perform a preliminary operation including controlling the forward/backward movement driver such that at least one of the pin member and the shoulder member in a non-rotating state presses the workpiece before the clamp member presses the workpiece; and
upon performing the preliminary operation, perform a joining operation including start controlling the rotation driver and the forward/backward movement driver such that the forward/backward movement driver is driven to cause the clamp member to first press the workpiece before the rotation driver is driven to rotate the pin member and the shoulder member such that the at least one of the pin member and the shoulder member in a rotating state is pressed into the workpiece thereby stirring the workpiece.

2. The friction stir spot welding apparatus according to claim 1, wherein
the controller is programmed to control the forward/backward movement driver in the preliminary operation such that first, the pin member presses the workpiece, second, the shoulder member presses the workpiece, and third, the clamp member presses the workpiece.

3. A friction stir spot welding method comprising:
applying a sealant to at least one of a first member and a second member and bringing the first member and the second member into contact with each other such that the sealant is sandwiched between the first member and the second member, which forms a workpiece;
pressing a distal end of at least one of a columnar pin member and a cylindrical shoulder member on the workpiece in a non-rotating state, the columnar pin member being inserted in the cylindrical shoulder member;
after the pressing of the distal end of at least one of the columnar pin member and the cylindrical shoulder member on the workpiece, pressing a cylindrical clamp member on the workpiece such that the applied sealant is squeezed away from the columnar pin member, the cylindrical shoulder member being inserted in the cylindrical clamp member; and
after the pressing of the cylindrical clamp member on the workpiece, rotating the columnar pin member while the cylindrical clamp member presses on the workpiece, and at least one of the cylindrical shoulder member and the columnar pin member, in a rotating state, being pressed into the workpiece such that the first member and the second member are softened by frictional heat and stirred to be joined together.

4. The friction stir spot welding method according to claim 3, wherein the pressing of the distal end of at least one of the columnar pin member and the cylindrical shoulder member on the workpiece includes:
pressing the workpiece with the columnar pin member; and upon the workpiece being pressed by the columnar pin member, pressing the workpiece by the shoulder member.

* * * * *